United States Patent [19]

Phillips et al.

[11] 4,438,481

[45] Mar. 20, 1984

[54] DOUBLE LAYER CAPACITOR

[75] Inventors: Jeffrey Phillips, Arlington Heights; Hiroshi Takei, Wheeling, both of Ill.

[73] Assignee: United Chemi-Con, Inc., Rosemont, Ill.

[21] Appl. No.: 429,311

[22] Filed: Sep. 30, 1982

[51] Int. Cl.³ .......................... B01J 21/02; H01G 9/00
[52] U.S. Cl. .................................... 361/433; 252/62.2
[58] Field of Search ......................... 252/62.2; 361/433

[56] References Cited

U.S. PATENT DOCUMENTS 2,749,487  6/1956  Jenny et al. .......................... 252/62.2
3,648,126  3/1972  Boos et al. ........................... 361/433

OTHER PUBLICATIONS

Electrical & Electronics Abstracts, vol. 83, No. 989 (May 1980) #18654.

*Primary Examiner*—John F. Niebling
*Attorney, Agent, or Firm*—Mason, Kolehmainen, Rathburn & Wyss

[57] ABSTRACT

An electrical capacitor is described which comprises a housing, a pair of electrodes in said housing, one of said electrodes being composed of a mixture of carbon particles and an electrolyte and the other electrode being composed of a mixture of lead metal and the same electrolyte, and an ionically conductive separator means between and in contact with said pair of electrodes, electronically separating said electrodes from each other, wherein the electrolyte comprises an acidic solution of soluble sulfate salts.

4 Claims, 9 Drawing Figures

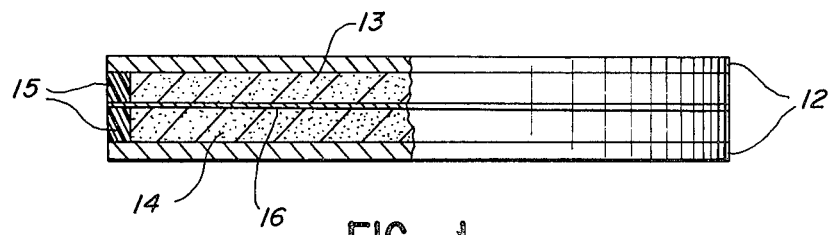
FIG. 1
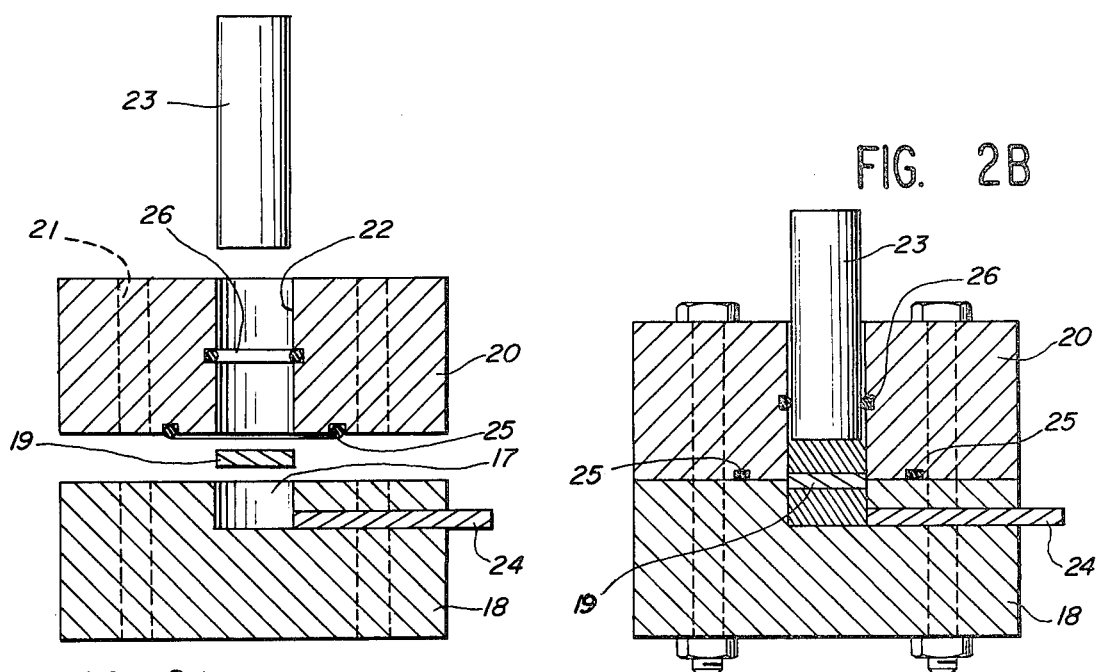
FIG. 2A
FIG. 2B
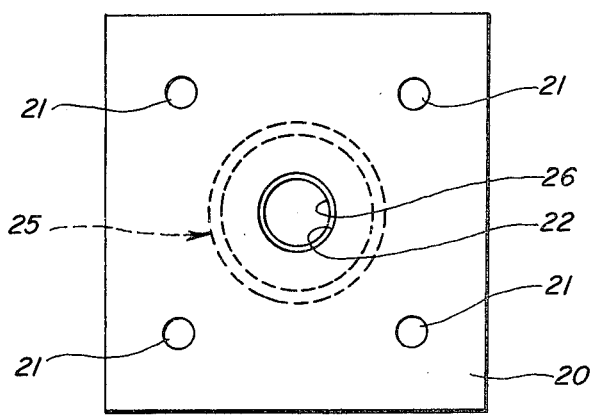
FIG. 3

DOUBLE LAYER CAPACITOR

The invention relates to double layer electrical capacitors. More particularly, it relates to capacitors comprising a pair of electrodes, a separator which functions as an electronic insulator and as an ionic conductor, and an ammonium sulfate/sulfuric acid electrolyte which serves as an ionic conductor.

The electrode structures in said capacitors are of two types. One is a reactive lead electrode of high surface area. The other electrode comprises carbon particles which are maintained in intimate contact to provide electrical continuity.

BACKGROUND OF THE INVENTION

Double layer capacitors are electrical storage devices which fulfill the need for reserve power sources for microcomputers. The devices are small in size but have enough capacitance to serve as a power source for a sufficient time to protect the computer memory from erasure during a power failure or shut down.

Double-layer capacitors are described in the Hosokawa et al. U.S. Pat. No. 4,313,084, Jan. 26, 1982. In such capacitors, carbon pastes made of fine activated carbon powder having a high surface area are mixed with a sulfuric acid electrolyte and formed into electrodes of a capacitor. The electrodes are separated by a porous separator which functions as an electronic insulator and allows ionic conduction. Such carbon paste capacitors are reported to have high capacitance attributed to the high surface area of the carbon particles. Similar carbon paste capacitors are described in the Boos U.S. Pat. No. 3,536,963, Oct. 27, 1970. In both of the patents referred to above, the capacitors consist of a pair of identical electrode assemblies made up of carbon paste and an electrolyte. Similar capacitors are described in an article by Sanada and Hosokawa in NEC Research & Development, No. 55, October 1979, pp. 21-27. Because of the large surface area of the activated carbon particles, the capacitors have a large capacitance for a relatively small size.

The Boos et al. U.S. Pat. No. 3,648,126, Mar. 7, 1972, describes electrical capacitors with paste electrodes of the type referred to above. In these capacitors, one electrode is a paste of carbon particles of high surface area mixed with an alkaline electrolyte and the other electrode is composed of powdered metal and electrolyte. The powdered metal is described as copper, nickel, cadmium, zinc, iron, manganese, lead, magnesium, titanium, silver, cobalt, indium, selenium and tellurium, of particle size less than 10 microns.

GENERAL DESCRIPTION OF THE INVENTION

We have discovered that double layer capacitors comprising a carbon particle electrode combined with a finely divided lead particle electrode produces desirable results when combined with an electrolyte comprising a soluble sulfate or combustion of a soluble sulfate and sulfuric acid.

The carbon particle electrode provides the high surface area necessary for high capacitance while the lead particle electrode stores chemical energy as a result of the electrical conversion of lead sulfate to lead. During the discharge of the double layer capacitor the voltage of the carbon electrode decreases as the charge is depleted but the voltage of the lead electrode remains constant as lead is anodised to lead sulfate. The electrolyte contains sulfate ion to inhibit lead migration away from the lead electrode. It has been found that in sulfate solutions the carbon capacitance decreases sharply above pH 1. Leakage current values are also pH dependent and decrease as the pH decreases (see Table 1).

TABLE 1

| Electrolyte | Leakage Current at 1.25V |
|---|---|
| 2M(NH4)2SO4 pH2 | 4 μA/F |
| 2M(NH4)2SO4 + 1M H2SO4(Ph 0.3) | 1 μA/F |

However, at the lower operating pHs the corrosion rate of lead becomes significant with the resultant rapid loss in lead capacity and increase in solution pH. It is, therefore, advantageous to adjust the pH of the acid solution by the addition of ammonium sulfate. This reduces the acidity of the solution by shifting equilibrium (1) to the right hand side.

$$H^+ + SO_4^{2-} \rightleftharpoons HSO_4^- \tag{1}$$

The result is a buffered sulfate solution which minimizes the hydrogen ion concentration while maximizing the time period over which the device performance is invariant. Capacitors employing an aqueous electrolyte with ammonium sulfate (0.5 to 5 molar concentration) and sulfuric acid have high capacitance with extremely low leakage current when operating at a low voltage, typically between 0.6 and 1.4 V.

BRIEF DESCRIPTION OF THE DRAWING

FIG. 1 of the drawing illustrates an electrical capacitor with paste electrodes assembled in a capacitor cell. The cell is comprised of a pair of ionic insulating members 12 which can be made of carbon, lead, iron, nickel or any of the conducting alloys, separated by a pair of annular gaskets 15 supporting a separator 16 made of highly porous material which functions as an electronic insulator between the electrodes. Electrode 13 is a carbon paste electrode and electrode 14 is a lead particle paste electrode, the liquid in both of these pastes being a 2 M ammonium sulfate/dilute sulfuric acid electrolyte at pH 0.3 to 1.0;

FIG. 2 illustrates a pair of cell blocks for the production of powdered carbon/powdered lead electrodes;

FIG. 3 is a top plan view of the upper cell block of FIG. 2;

FIG. 9 shows the self-discharge curve for a capacitor cell constructed in accordance with this application; the numerical values are set forth in Table II.

DETAILED DESCRIPTION OF THE INVENTION

Figure 4:
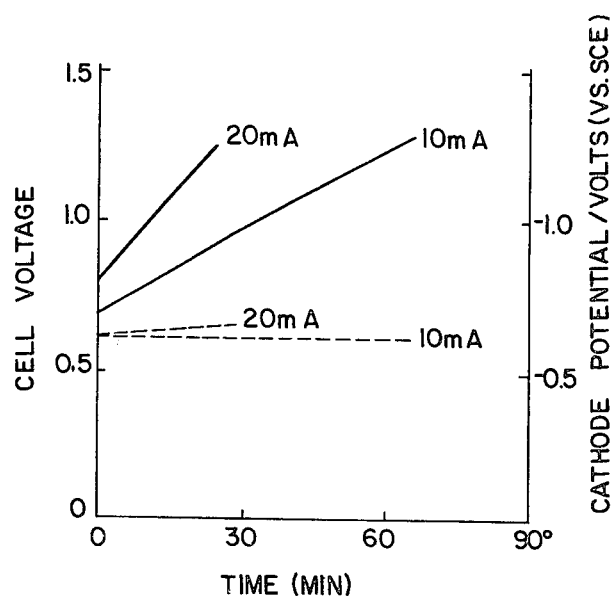
FIGS. 4-7 are dc charging curves for capacitor cells constructed in accordance with this application.

A simple method of producing a carbon paste/lead particle paste hybrid double layer capacitor can be described with reference to FIG. 2 of the drawing. Lead powder, which is used to form the negative electrode, is soaked in the 0.5-5 M ammonium sulfate/sulfuric acid electrolyte at pH 0.3 to 2.0 to stabilize the surface reactivity of the particles. When freshly produced lead powder is used, the surface thereof is very reactive initially and hydrogen evolution inside the cell would result unless the surface is stabilized by soaking in the electrolyte. After the surface pretreatment, excess electrolyte is removed (absorbed) from the lead particles with filter paper and the particles are loaded into the chamber 17 of the bottom block 18 of the device shown in FIG. 2. Prior to introduction of lead particles, a lead sheet (not shown) which acts as a current collector is placed on the bottom of the chamber. The lead particles are pressed tightly by hand pressure at the top of the chamber. After the surface of the lead particle electrode in the chamber is compressed, it is flattened and covered with a glass fiber filter (or micro-porous polypropylene film) which serves as a separator 19. The separator is impregnated with electrolyte prior to application. Thereafter, the upper part of the cell block 20 is attached tightly to the lower section 18 with bolts and nuts (not shown) in holes 21 and forms a compartment for the carbon paste anode. The desired amount of carbon paste is loaded into the upper chamber 22 and compressed with the carbon cylinder 23 to form the carbon particle electrode. The carbon cylinder 23 serves as the current collector for the anode and a carbon rod 24 sealed in the lower part of the cell block serves as the current collector for the cathode. Viton O-rings 25 and 26 serve to make the blocks 18 and 20 liquid-tight when bolted together.

Figure 5:
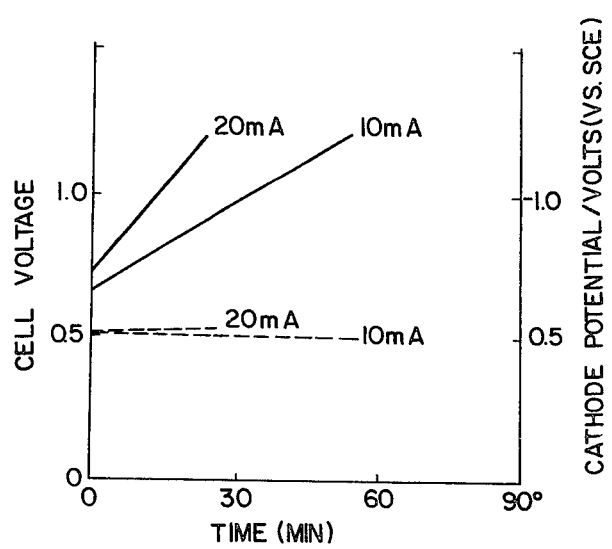
Figure 6:
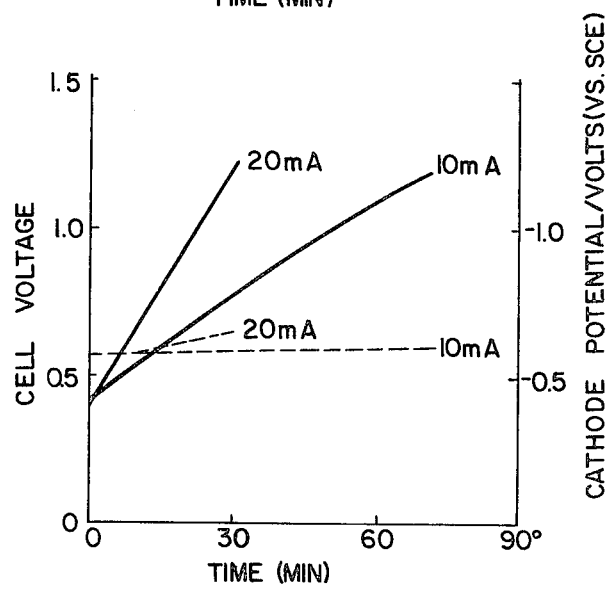
Figure 7:
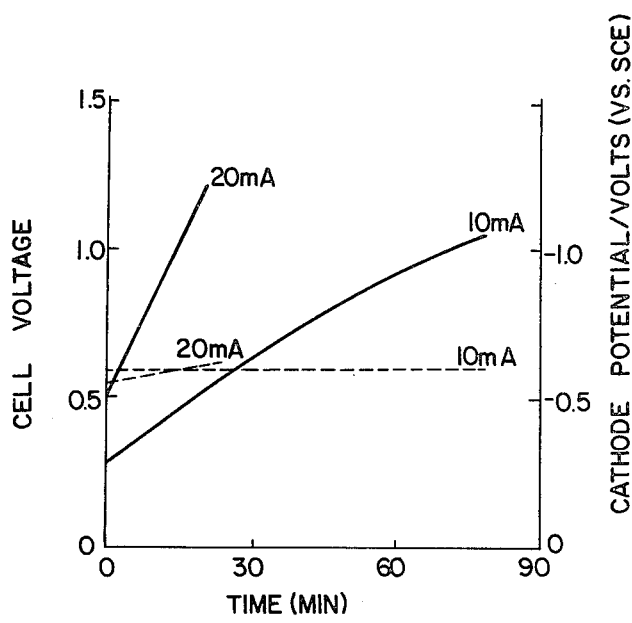

FIGS. 4-7 show dc charging curves for cells constructed as above with different combinations of materials. These curves have been obtained from data from a series of charge-discharge cycles in which no change in performance was observed from one cycle to the next. In FIG. 4, the activated carbon is Norit A, the lead particles are −100 mesh 99% Pb and the electrolyte is 5 M sulfuric acid. In FIG. 5, the activated carbon is Norit A and the lead particles are −325 mesh 99.99% Pb and the electrolyte 5 M sulfuric acid. In FIG. 6, the activated carbon is Norit A, the lead particles are −100 mesh 99% Pb and the electrolyte is 2 M ammonium sulfate containing sufficient sulfuric acid to bring the pH to 2.0. In FIG. 7, the activated carbon is coconut charcoal, the lead particles are −100 mesh 99% Pb and the electrolyte is 2 M ammonium sulfate with sufficient sulfuric acid to bring the pH to 2.0. The volume of lead powder in each case is 1 cc as is the amount of activated carbon.

As seen from FIGS. 4-7, the cell voltage increases quite linearly while the potential of lead stays at or very close to its original value. The leakage current during charge at 1.1 V is 3 μA/F and at 1.25 V is 4 μA/F.

Figure 8:
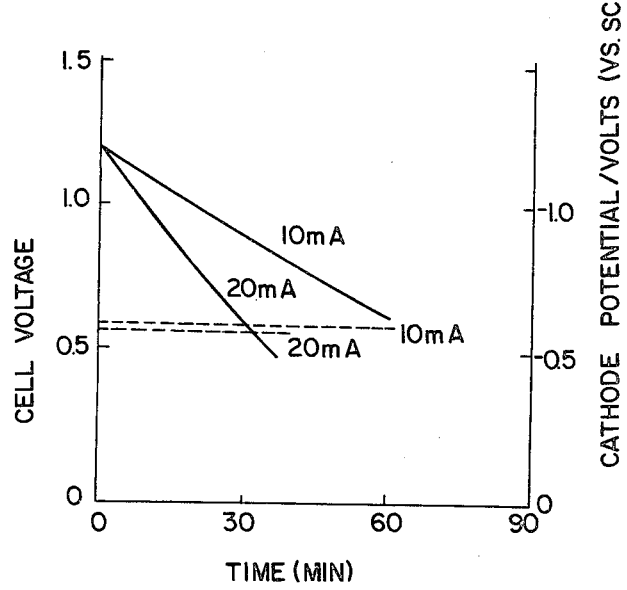
FIG. 8 shows the discharge curves for a capacitor cell of this application.

Five cells are needed to make a 5.5 V device and four cells for a 5.0 V device. These devices operate properly in the voltage range of 5.5 to 3.0 volts and 5.0 to 2.4 volts, respectively. FIG. 8 shows the discharge curves for the carbon paste-lead particle paste capacitors of this invention at 10 milliamperes and 20 milliamperes.

The lead powder is 1 cc of 99.99% lead of −100 mesh and the carbon is a high surface area activated carbon. The electrolyte is a mixture of one molar sulfuric acid and two molar ammonium sulfate. FIG. 9 shows the decay in voltage of this system after being charged to a voltage of 1.25 V (leakage current value = 1 μA/F). After 300 hours the system still maintained a voltage of 1.14 V. Table II sets forth the voltage/time data. The rate of voltage decay is approximately ¾ that of a double layer capacitor with two carbon paste electrodes charged to 0.6 V in a 5 M sulfuric acid solution. The data are set forth in Table III.

TABLE II

Voltage Decay on Open Circuit for Double Layer Capacitor With One Carbon and One Lead Electrode

| TIME (HRS) | CELL VOLTAGE (VOLTS) |
|---|---|
| 0 | 1.25 |
| 10 | 1.228 |
| 20 | 1.215 |
| 30 | 1.205 |
| 40 | 1.198 |
| 50 | 1.193 |
| 60 | 1.19 |
| 70 | 1.185 |
| 80 | 1.182 |
| 90 | 1.178 |
| 100 | 1.175 |

TABLE III

Voltage Decay on Open Circuit for Double Layer Capacitor With Two Carbon Electrodes

| TIME (HRS) | CELL VOLTAGE (VOLTS) |
|---|---|
| 0 | 0.61 |
| 10 | 0.595 |
| 20 | 0.580 |
| 30 | 0.568 |
| 40 | 0.558 |
| 50 | 0.55 |
| 60 | 0.542 |
| 70 | 0.534 |
| 80 | 0.526 |
| 90 | 0.518 |
| 100 | 0.51 |

The carbon-lead capacitors described herein have several advantages in terms of volumetric efficiency over carbon-carbon capacitors of the prior art. First, the volume of the carbon-lead capacitor need be no more than one-half of the volume of the carbon-carbon capacitor to give the same capacitance. Second, the higher voltage rating of the carbon-lead cell enables assembly of a capacitor device with fewer cells for a given voltage rating. The carbon-lead cell can be used at 1.25 V while commercial carbon-carbon devices operate at 0.63 V/cell. Thus a carbon-lead device needs only one-half the number of cells of a carbon-carbon device of the same voltage rating. Third, because capacitor cells are connected in series, the capacitance of the device equals the capacitance of the cell divided by the number of cells in series. Thus, because of the second factor above, the carbon-lead device enjoys another advantage factor of 2 over the carbon-carbon device. Each of these three factors is responsible for an advantage of 2 for the carbon-lead device, giving a total advantage of 2×2×2=8 in volumetric improvement.

For example, the capacitance of a carbon-carbon cell, with 1 cc activated carbon (Norit A) for each electrode in 5 M sulfuric acid, was 34 F. Commercial carbon-carbon devices operate at 0.63 V/cell so 8 cells are needed for a 5 V rating. Because the cells are connected in series, each cell must have a capacitance equal to 8 times the device rating. Thus, for a 1 F rating, each cell must be 8 F. The cell volume is 2 cc×8/34=0.48 cc and the device volume is 8×0.48=3.8 cc.

In contrast, the capacitance of a carbon-lead cell in accordance with this application with 0.5 cc activated carbon (Norit A) and 0.5 cc 100-mesh 99% lead powder in 5 M ammonium sulfate at pH 2 was 39 F. Our measurements show that a cell voltage of 1.25 V is suitable so only 4 unit cells are needed for the same 5 V device.

Each cell must have a capacitance of 4×1=4 F. The cell volume is 1 cc×4/39=0.10 cc and the device volume is 4×0.10=0.40 cc. This is about one-tenth the size of a corresponding carbon-carbon device.

During operation the potential of a carbon electrode should not become too negative or else the leakage residual current will be excessive. In general, this maximum negative voltage should be 0.4 V below the carbon open circuit potential. The potential of the lead electrode is fixed at about −0.6 V vs. a saturated calomel reference electrode (S.C.E.); this is about −0.9 V compared to the carbon open circuit potential. To prevent the carbon from going too negative, the cell voltage should not be driven below 0.6 V.

A major application for double layer capacitors is as a back-up power source for volatile semiconductor memory devices. Such memories usually operate at 5.0-5.5 V and require a minimum of 3 V to maintain memory. A 5-cell carbon-lead double layer capacitor (rated at 6 V) could provide a minimum of 3 V during discharge without draining excessive residual current. Thus carbon-lead double layer capacitor is ideally suited for this application.

The lead electrode in the form of fine particles may have problems of excessive self discharge and the difficulty of maintaining particle-particle contact. These problems can be avoided by use of porous lead electrodes or sintered lead pellets. Electrochemically or mechanically roughened lead sheets can also be used as electrodes.

Four or five cells may be required to construct a 5 V device and in order to achieve a 1 F total capacity a 5 F unit cell must be employed. This would result in a 5 V, 1 F capacitor with a leakage current less than 15 μA. This value is considerably lower than all other values quoted in the U.S. Pat. Nos. 3,648,126, 3,634,736 and 3,536,963. A currently available commercial carbon-carbon device with a similar rating demonstrates a leakage current of 40 μA.

Table IV sets forth the charge and discharge data for a cell containing 1 cc of activated carbon and 1 cc of 325-mesh lead powder in 1 M sulfuric acid 2 M ammonium sulfate electrolyte.

TABLE IV

| Time/Min | cell | lead(SCE) |
|---|---|---|
| | 10mA Charge | |
| 0 | 0.59 to 0.65 | −0.54 to −0.56 |
| 3 | 0.696 | −0.564 |
| 6 | 0.727 | −0.566 |
| 9 | 0.753 | −0.567 |
| 12 | 0.780 | −0.568 |
| 15 | 0.806 | −0.568 |
| 18 | 0.832 | −0.568 |
| 21 | 0.857 | −0.568 |
| 24 | 0.882 | −0.569 |
| 27 | 0.903 | −0.569 |
| 30 | 0.930 | −0.569 |
| 33 | 0.958 | −0.569 |
| 36 | 0.982 | −0.570 |
| 39 | 1.008 | −0.570 |
| 42 | 1.037 | −0.570 |
| 45 | 1.064 | −0.570 |
| 48 | 1.095 | −0.571 |
| 51 | 1.122 | −0.571 |
| 54 | 1.152 | −0.571 |
| 57 | 1.180 | −0.572 |
| 60 | 1.207 | −0.572 |
| 63 | 1.232 | −0.572 |
| 66 | 1.257 | −0.572 |

TABLE IV-continued

| Time/Min | cell | lead(SCE) |
|---|---|---|
| 69 | 1.278 | −0.572 |
| 72 | 1.296 | −0.572 |
| 75 | 1.310 | −0.572 |
| | 10mA Discharge | |
| 0 | 1.260 to 1.220 | −0.548 to −0.535 |
| 3 | 1.150 | −0.527 |
| 6 | 1.106 | −0.518 |
| 9 | 1.060 | −0.508 |
| 12 | 1.014 | −0.501 |
| 15 | 0.976 | −0.497 |
| 18 | 0.940 | −0.492 |
| 21 | 0.904 | −0.489 |
| 24 | 0.873 | −0.488 |
| 27 | 0.844 | −0.485 |
| 30 | 0.816 | −0.482 |
| 33 | 0.790 | −0.481 |
| 36 | 0.762 | −0.478 |
| 39 | 0.738 | −0.477 |
| 42 | 0.713 | −0.476 |
| 45 | 0.690 | −0.473 |
| 48 | 0.666 | −0.471 |
| 51 | 0.640 | −0.470 |
| 54 | 0.620 | −0.469 |
| 57 | 0.597 | −0.467 |
| 60 | 0.572 | −0.465 |
| | 20mA Charge | |
| 0 | 0.587 to 0.690 | −0.554 to −0.600 |
| 3 | 0.770 | −0.608 |
| 6 | 0.827 | −0.609 |
| 9 | 0.878 | −0.610 |
| 12 | 0.928 | −0.611 |
| 15 | 0.978 | −0.611 |
| 18 | 1.030 | −0.612 |
| 21 | 1.085 | −0.613 |
| 24 | 1.144 | −0.613 |
| 27 | 1.206 | −0.614 |
| 30 | 1.264 | −0.614 |
| 33 | 1.316 | −0.615 |
| 36 | 1.363 | −0.616 |
| | 20mA Discharge | |
| 0 | 1.243 to 1.180 | −0.574 to −0.550 |
| 3 | 1.080 | −0.540 |
| 6 | 0.966 | −0.520 |
| 9 | 0.874 | −0.498 |
| 12 | 0.798 | −0.484 |
| 15 | 0.733 | −0.469 |
| 18 | 0.678 | −0.463 |
| 21 | 0.624 | −0.457 |
| 24 | 0.572 | −0.452 |
| 27 | 0.526 | −0.447 |
| 30 | 0.473 | −0.442 |
| 33 | 0.425 | −0.438 |
| 36 | 0.373 | −0.436 |

We claim:

1. An electrical capacitor comprising a housing, a pair of electrodes in said housing, one of said electrodes being composed of a mixture of carbon particles and an electrolyte and the other electrode being composed of a mixture of lead metal and the same electrolyte, and an ionically conductive separator means between and in contact with said pair of electrodes, electronically separating said electrodes from each other, wherein the electrolyte comprises a solution of soluble sulfate salts of concentration in the range from 0.5 to 5 molar at an acid pH preferably not greater than 2.

2. An electrical capacitor according to claim 1 wherein the electrolyte is composed of ammonium sulfate and sulfuric acid.

3. An electrical capacitor according to claim 2 wherein the pH of the electrolyte is in the range from 0.3 to 1.

4. An electrical capacitor according to claim 3 wherein the concentration of ammonium sulfate in the electrolyte is in the range from 0.5 to 5 molar.

* * * * *